(12) United States Patent
Pesquet-Popescu et al.

(10) Patent No.: US 6,983,021 B2
(45) Date of Patent: Jan. 3, 2006

(54) METHOD OF ENCODING A SEQUENCE OF FRAMES

(75) Inventors: Beatrice Pesquet-Popescu, Fontenay-Sous-Bois (FR); Vincent Bottreau, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 694 days.

(21) Appl. No.: 10/117,591

(22) Filed: Apr. 5, 2002

(65) Prior Publication Data

US 2003/0026339 A1    Feb. 6, 2003

(30) Foreign Application Priority Data

Apr. 10, 2001  (EP) ................................. 01400919
Apr. 12, 2001  (EP) ................................. 01400941

(51) Int. Cl.
*H04N 7/12*       (2006.01)
*H04N 11/02*      (2006.01)

(52) U.S. Cl. ............................................. 375/240.16
(58) Field of Classification Search ............ 348/402.1, 348/407.1, 413.1, 415.1; 375/240.12, 240.24, 375/240.11, 240.29
See application file for complete search history.

(56) References Cited

U.S. PATENT DOCUMENTS 5,301,020 A * 4/1994 Cassereau ............. 375/240.12
6,381,276 B1 * 4/2002 Pesquet-Popescu .... 375/240.11

OTHER PUBLICATIONS

"An embedded wavelet video coder using three-dimensional set partitioning in hierarchical trees (SPIHT)", by B.-J. Kim and W.A. Pearlman, Proceedings of Data Compression Conference, Snowbird, USA, Mar. 25-27, 1997, pp. 251-260.

"Factoring wavelet transforms into lifting steps", by I. Daubechies and W. Sweldens, Journal of Fourier Analysis applications, vol. 4, No. 3, 1998, pp. 247-269.

"Three-dimensional subband coding with motion compensation", J.R. Ohm, IEEE Transactions on Image Processing, vol. 3, No. 5, 1994, pp. 559-571.

"Motion-compensated 3D subband coding of video", S.J. Choi and J.W. Woods, IEEE Trans. on Image Processing, vol. 8, No. 2, pp. 155-164, Feb. 1999.

B. Pesquet-Popescu et al; "Three-Dimensional Lifting Schemes for Motion Compensated Video Compression", 2001 IEEE International Conference on Acoustics, Speech, and Signal Processing. Proceedings (Cat. No. 01CH37221), Salt Lake Ciyt,UT, May 7-11, 2001, vol. 3, pp. 1793-1796, XP002172582.

* cited by examiner

*Primary Examiner*—Vu Le
*Assistant Examiner*—Behrooz Senfi

(57) ABSTRACT

The invention relates to a method for encoding a sequence of frames by means of a three-dimensional (3D) subband decomposition involving a filtering step applied to the frames considered as a 3D volume. The decomposition is applied to successive groups of frames after the implementation, on the frames of each group, of motion estimation and compensation operations in the low frequency temporal subbands at each level of the temporal decomposition, the compensation operation leading, among the filtered pixels, to double-connected pixels corresponding in the current frame to regions of the reference frame becoming uncovered during motion. According to the invention, the identification step of double-connected pixels is followed by a decision step based on a minimization criterion and provided for choosing in the current frame, for the temporal filtering of a double-connected pixel of the reference frame, the pixel that leads to a minimum energy of the detail subband. Moreover, when the temporal part of the 3D decomposition is a temporal wavelet transform that includes a temporal filtering based on the lifting scheme, said temporal filtering includes an overlapped motion compensation using in the prediction step of said scheme an average of pixels from adjacent windows in the reference frame.

4 Claims, No Drawings

METHOD OF ENCODING A SEQUENCE OF FRAMES

The present invention generally relates to video compression and, more specifically, to a method for encoding a sequence of frames by means of a three-dimensional (3D) subband decomposition involving a spatial and temporal filtering step applied to the 3D spatio-temporal data which correspond to said sequence of frames considered as a 3D volume, said decomposition being applied to successive groups of frames only after the implementation, on the frames of each group, of block-based motion estimation and compensation operations in the low frequency temporal subbands at each level of the temporal decomposition, and this compensation operation leading, among the filtered pixels, to double-connected pixels corresponding in the current frame to regions of the reference frame becoming uncovered during motion.

The recent expansion of multimedia applications and the need for delivering compressed bitstreams over heterogeneous networks have led to consider scalability as a very important feature for video coders. Three-dimensional (3D) wavelet decompositions provide a natural spatial resolution and frame rate scalability. Embedded coding algorithms, like the 3D SPIHT algorithm described for instance in "An embedded wavelet video coder using three-dimensional set partitioning in hierarchical trees (SPIHT)", by B.-J. Kim and W. A. Pearlman, Proceedings of Data Compression Conference, Snowbird, USA, Mar. 25–27, 1997, pp. 251–260, lead to the desired SNR scalability, by using in-depth scanning of the coefficients in hierarchical trees and bitplane encoding. A global coding/decoding scheme applied to a sequence of frames may include a temporal multiresolution analysis in the direction of the motion between successive frames, in order to take into account large displacements (more precisely, Haar filters are applied at each resolution level on the motion compensated frames), said temporal analysis being followed by a spatial multiresolution analysis of the resulting temporal subbands. The coding method is a modified 3D SPIHT algorithm followed by a contextual arithmetic coder. In this way, scalability is achieved in temporal and spatial resolutions, as well as in quality.

However, while several works addressed scalable coding algorithms and the possible improvements of the spatial wavelet transforms, there was little effort in the direction of exploiting the particularities of the temporal wavelet transform used in 3D decompositions. A temporal wavelet transform is inherently non-linear, due to the motion estimation step. The so-called lifting scheme, described for instance in "Factoring wavelet transforms into lifting steps", by I. Daubechies and W. Sweldens, Journal of Fourier Analysis applications, vol.4, no 3, 1998, pp.247–269, provides a flexible framework for building wavelet transforms (its interest for processing monodimensional signals and for providing suitable decompositions for image coding or feature extraction has already been proven). The advantages of this scheme are both in terms of complexity ("in-place" calculation) and additional functionalities: not only every linear wavelet decomposition can be put in this form, but it allows the introduction of nonlinear operators in the predict-update steps as well.

An important issue concerning temporal multiresolution analysis is the choice of the temporal filter length: long filters take better advantage of the temporal correlation existing between successive frames. However, it was shown in "Three-dimensional subband coding with motion compensation", J. R. Ohm, IEEE Transactions on Image Processing, vol. 3, no. 5, 1994, pp. 559–571, that said long filters do blur the motion and increase buffer memory requirements (corresponding to the filter length) and reconstruction delay at the decoder side, which might not be desirable in real-time applications. Moreover, the coding efficiency is not increased significantly by performing a temporal analysis with longer filters. Therefore, Haar filters are preferred for temporal filtering. Moreover, when Haar filters are used for the temporal decomposition, motion estimation and motion compensation (ME/MC) are only performed every two frames of the input sequence due to the temporal downsampling by two. By iterating this procedure over several decomposition levels on the temporal approximation subbands, the total number of ME/MC operations is roughly the same as in a predictive scheme.

However, motion compensated temporal filtering raises the problem of double-connected and unconnected pixels, i.e. of the pixels that are filtered twice or not at all. A solution, proposed in "Motion-compensated 3D subband coding of video", S. J. Choi and J. W. Woods, IEEE Trans. on Image Processing, vol. 8, no. 2, pp. 155–164, February 1999, may be to compute a high-pass coefficient at the same location as the pixel in the current frame, and to take as a low-pass coefficient the colocated pixel in the motion-compensated reference frame. In the case of multiple-connected pixels, it is possible to scan the current frame from top to down, from left to right and to consider for computation of the low-pass coefficient the first pixel in the current frame pointing to it. Nevertheless, it appears that this is not the best strategy.

At a given resolution level, one can denote by H[m,n] the pixels in the temporal high frequency subband, by L[m,n] the pixels in the low frequency subband, and by $(u_{m,n}, v_{m,n})$ the two components of the motion vector associated to the pixel (m,n). If fractional pel motion estimation is allowed, then the integer part of the motion vector will be denoted by $(\bar{u}_{m,n}, \bar{v}_{m,n})$. Therefore, in Choi's method, the equations that allow to compute the high and low-pass subbands for connected pixels are the following ones:

$$H[m,n] = (B[m,n] - \tilde{A}[m - u_{m,n}, n - v_{m,n}])/\sqrt{2} \quad (1)$$

$$L[m - \bar{u}_{m,n}, n - \bar{v}_{m,n}] = (B[m - \bar{u}_{m,n} + u_{m,n}, n - \bar{v}_{m,n} + v_{m,n}] + A[m - \bar{u}_{m,n}, n - \bar{v}_{m,n}])/\sqrt{2} \quad (2)$$

where $\tilde{X}$ stands for an interpolated value of the field X. For unconnected pixels, the high frequency component is obtained as before, and the low frequency values are simply scaled values of the reference pixels:

$$L[m,n] = A[m,n] \cdot \sqrt{2} \quad (3)$$

As a particular case of the lifting scheme for the Haar transform, it is possible to write the temporal low-pass filtering in the motion direction as:

$$L[m - \bar{u}_{m,n}, n - \bar{v}_{m,n}] = H[m - \bar{u}_{m,n} + u_{m,n}, n - \bar{v}_{m,n} + v_{m,n}] + \sqrt{2} A[m - \bar{u}_{m,n}, n - \bar{v}_{m,n}] \quad (4)$$

This equation, considered together with (1), allows to deduce the form of the non-linear operators P (predict) and U (update) used in the temporal Haar lifting. It can be seen that P is a motion compensation operator (C), followed, in case of a fractional pel motion estimation, by an interpolation (I). In the meantime, U can be identified as a motion compensation operator, using the same motion vectors as in P, but with the opposite sign, followed by an interpolation. In the sequel, these operations will be denoted by:

$$P\{.\}=I\{C\{.\}\}$$

and $U\{.\}=I\{\overline{C}\{.\}\}$ and the position $(m-\overline{u}_{m,n}, n-\overline{v}_{m,n})$ by $(p,q)$.

With these notations, the temporal analysis of connected pixels can be written as:

$$H[m, n] = \frac{1}{\sqrt{2}}(B[m, n] - I\{C\{A[m, n]\}\})$$

$$L[p, q] = I\{\overline{C}\{H[p, q]\}\} + A[p, q] \cdot \sqrt{2}$$

while for the synthesis part, one has:

$$A[p, q] = \frac{1}{\sqrt{2}}(L[p, q] - I\{\overline{C}\{H[p, q]\}\}) \quad (7)$$

for connected pixels (unconnected pixels in the reference frame are obtained directly from Eq. (3) given above), and:

$$B[m,n] = \overline{2}H[m,n]+I\{C\{A[m,n]\}\} \quad (8)$$

It is therefore a first object of the invention to use such a lifting formulation to modify the update operator so as to improve the processing of uncovered zones.

To this end, the invention relates to an encoding method such as defined in the introductory part of the description and which is moreover characterized in that said identification step of double-connected pixels is followed by a decision step based on a minimization criterion and provided for choosing in the current frame, for the temporal filtering of a double-connected pixel of the reference frame, the pixel that leads to a minimum energy of the detail subband, the considered energy being an average energy around said double-connected pixel in the high frequency temporal subband, and said average energy being computed by means of a low-pass filtering operation.

The proposed technical solution is intended to associate a pixel at a given position in the reference frame A to its closest value in the current frame B, which is obtained by minimizing the energy of the detail subband.

In a particularly advantageous embodiment, said minimization criterion is provided for joining to the energy criterion a second one that carries out a minimization of the norm of the motion vectors associated with the candidate connected pixels.

In such a case, said minimization criterion based on the norm of the motion vectors may use a threshold applied to the values of said norm, in order not to take into account for the optimization the too large motion vectors.

It is another object of the invention to use the lifting formulation to modify the update operator so as to reduce the blocking artefacts related to block-based motion compensation.

To this end, the invention relates to an encoding method such as defined above and in which the temporal part of said 3D decomposition is a temporal wavelet transform that includes a temporal filtering based on the so-called lifting scheme including at each decomposition level successively a splitting step, a prediction step and an updating step, said method being further characterized in that said temporal filtering includes an overlapped motion compensation using in the prediction step, for reducing the blocking artefacts induced by said block-based motion estimation, an average of pixels from adjacent windows in the reference frame.

The problem of unconnected and double-connected pixels is closely related to that of areas uncovered by moving objects. Indeed, consider two objects corresponding to a common part in a frame at a time T, and that become separate at the time $T+\Delta T$. In this case, two regions in the current frame will correspond by motion compensation to the same region in the reference (or previous) frame. For one of the objects, this region will be an uncovered area. This area will appear as double-connected in the reference frame. With respect to the approach described in the document "Motion-compensated 3D subband coding of video" already cited, that associates to these double-connected pixels the first block encountered in the motion compensation process, it is proposed to optimize this choice by applying some criteria based on the lifting scheme. The main structural property here exploited is that it is possible to use for the update step (computation of the temporal low frequency subband) all the information available from the predict step (high frequency subband) and causal information in the low frequency subband.

The basic idea corresponding to the first proposed criterion is related to the energy of the detail subband of the two moving objects. If the first object was on the foreground at time T, the uncovered region in the second object will give rise to a higher energy of the detail coefficients. The second criterion is a condition of regularization of the motion field: if several pixels are connected to the same pixel in the reference frame, the one with the smallest displacement will be chosen for filtering.

These ideas may be formalized within the above nonlinear lifting framework. In the case of multiple-connected pixels in the reference frame, if one considers one of them at the position $(p,q)$ and two pixels found by the motion estimation algorithm at the positions $(m_1,n_1)$ and $(m_2,n_2)$ in the current frame, with two corresponding motion vectors $(u_{m_1,n_1}, v_{m_1,n_1})$ and $(u_{m_2,n_2}, v_{m_2,n_2})$, one has:

$$m_1-\overline{u}_{m_1,n_1}=m_2-\overline{u}_{m_2,n_2}=p, \ n_1-\overline{v}_{m_1,n_1}=n_2-\overline{v}_{m_2,n_2}=q \quad (9)$$

Using this observation, equations (5) and (6) can be written for each of the two pixels $(m_1,n_1)$ and $(m_2,n_2)$, yielding two different values $H[m_1,n_1]$ and $H[m_2,n_2]$ in the detail subband. Consequently, the value in the approximation subband can be computed using either of these two values (it can be noted that both values allow perfect reconstruction). Actually, $P_{(p,q)}$ designating the set of all pixels $(m,n)$ in the current frame connected to the pixel $(p,q)$ in the reference frame, one can remark that the perfect reconstruction property is guaranteed for any operator f such that:

$$L[p,q]=f(H[m-\overline{u}_{m,n}+u_{m,n},n-\overline{v}_{m,n}+v_{m,n}],(\ m,n)\in P_{(p,q)})$$
$$+A[p,q] \cdot \overline{2} \quad (10)$$

One criterion for the choice of the operator f is to minimize the energy of the detail subband so as to associate $A[p,q]$ to its "closest" value in frame B. This implies using for the low-pass filtering the pixel $(m_0,n_0)$ such that:

$$|I\{C\{\underline{H}[m_0-\overline{u}_{m_0,n_0}, n_0-\overline{v}_{m_0,n_0}]\}\}|=\min_{(m,n)\in P_{(p,q)}}|I\{$$
$$C\{H[m-\overline{u}_{m,n}, n-\overline{v}_{m,n}]\}\}|. \quad (11)$$

As for Choi's algorithm, in the proposed algorithm it is not necessary to transmit to the decoder the classification map (saying which pixels are connected and which ones are not). Since the decoder follows the symmetric procedure to that of the encoder, there will be ideally the same classification map resulting from decisions made on the energy of the high frequency coefficients.

Nevertheless, the decision based on the value of a single pixel is not robust enough. In particular, in the previous example, the two values in the high frequency subband may not be quantized with identical quantization steps, due to the progressive quantization strategy used in the SPIHT algorithm. So, this could lead to an erroneous decision. The above decision can then be made more robust by comparing the mean energy of the displaced frame difference (DFD) around the considered pixel:

$$e(p,q)^2 = \sum_{(k,l) \in S_{(p,q)}} (H(p-k, q-1)u(k,l))^2, \quad (12)$$

where S(p,q) is a neighborhood around the pixel (p,q) and u(k,l) corresponds to a weighting factor for each pixel in the neighborhood S(p,q), depending on its distance to the central point. For example, one can choose $u(k,l)=\alpha^{(|k|+|l|)}$, where $\alpha>0$ is a forgetting factor.

The second term in the minimization criterion is the norm of the motion vector, $\|\vec{d}_{m,n}\|=(u^2_{m,n}+v^2_{m,n})^{1/2}$. The regularized criterion can be expressed as $J(p,q)=e(p,q)^2+\lambda\|\vec{d}_{m,n}\|$, $\lambda$ being a regularization parameter. If the motion vector is too large, its value is not very reliable, so it can be chosen not to take it into account for the optimization. This yields the following criterion:

$$J(p,q)=e(p,q)^2+\lambda\|\vec{d}_{m,n}\|, \text{ if } \|\vec{d}_{m,n}\|\leq s \quad (13)$$

$$J(p,q)=e(p,q)^2+\lambda s, \text{ if } \|\vec{d}_{m,n}\|>s \quad (14)$$

where s is a threshold to be determined empirically. A penalty is therefore given to motion vectors larger than said threshold.

However, block-based motion estimation algorithms suffer from blocking artefacts. If the spatial transform that is applied to the resulting motion-compensated frames is a wavelet analysis, these artefacts lead to undesired large wavelet coefficients and consequently to a reduction of the coding efficiency. An improvement that can then be deduced from the previous nonlinear lifting formulation is related to the possibility of introducing an overlapped motion compensation within the temporal filtering algorithm, so as to reduce blocking artefacts. This operation involves using in the predict step an average of pixels from adjacent windows in the reference frame.

For example, if one considers an overlap of one pixel, the high-pass filtering of pixels belonging to the first (resp., the last) row of a block reads in this case as follows:

$$H[m,n] = \frac{1}{\sqrt{2}}\big[B[m,n] - \quad (9)$$

$$((1-\beta)\tilde{A}[m-u_{m,n}, n-v_{m,n}] + \beta\tilde{A}[m-1-u_{m-1,n}, n-v_{m-1,n}])\big]$$

resp., $$H[m,n] = \frac{1}{\sqrt{2}}\big[B[m,n] - ((1-\beta)\tilde{A}[m-u_{m,n}, n-v_{m,n}] + \quad (10)$$

$$\beta\tilde{A}[m+1-u_{m+1,n}, n+1-v_{m+1,n}])\big]$$

where β is a constant, 0<β<1.

A similar processing is applied to the first (resp., last) column of each block, according to the following equations:

$$H[m,n] = \frac{1}{\sqrt{2}}\big[B[m,n] - \quad (11)$$

$$((1-\beta)\tilde{A}[m-u_{m,n}, n-v_{m,n}] + \beta\tilde{A}[m-u_{m,n-1}, n-1-v_{m,n-1}])\big]$$

resp., $$H[m,n] = \frac{1}{\sqrt{2}}\big[B[m,n] - ((1-\beta)\tilde{A}[m-u_{m,n}, n-v_{m,n}] + \quad (12)$$

$$\beta\tilde{A}[m-u_{m,n+1}, n+1-v_{m,n+1}])\big]$$

The constant β is determined experimentally. In the present case, a constant β=0.2 has lead to the best results.

What is claimed is:

1. A method for encoding a sequence of frames by means of a three-dimensional (3D) subband decomposition involving a spatial and temporal filtering step applied to the 3D spatio-temporal data which correspond to said sequence of frames considered as a 3D volume, said decomposition being applied to successive groups of frames only after the implementation, on the frames of each group, of block-based motion estimation and compensation operations in the low frequency temporal subbands at each level of the temporal decomposition, and this compensation operation leading, among the filtered pixels, to double-connected pixels corresponding in the current frame to regions of the reference frame becoming uncovered during motion, said method further comprising a decision step based on a minimization criterion and provided for choosing in the current frame, for the temporal filtering of a double-connected pixel of the reference frame, the pixel that leads to a minimum energy of the detail subband, the considered energy being an average energy around said double-connected pixel in the high frequency temporal subband, and said average energy being computed by means of a low-pass filtering operation.

2. An encoding method according to claim 1, characterized in that said minimization criterion is provided for joining to the energy criterion a second one that carries out a minimization of the norm of the motion vectors associated with the candidate connected pixels.

3. An encoding method according to claim 2, in which said minimization criterion based on the norm of the motion vectors uses a threshold applied to the values of said norm, in order not to take into account for the optimization the too large motion vectors.

4. An encoding method according to claim 1, in which the temporal part of said 3D decomposition is a temporal wavelet transform that includes a temporal filtering based on the so-called lifting scheme including at each decomposition level successively a splitting step, a prediction step and an updating step, said method being further characterized in that said temporal filtering includes an overlapped motion compensation using in the prediction step, for reducing the blocking artefacts induced by said block-based motion estimation, an average of pixels from adjacent windows in the reference frame.

* * * * *